(12) United States Patent
Lee et al.

(10) Patent No.: US 8,443,206 B2
(45) Date of Patent: May 14, 2013

(54) METHOD AND APPARATUS FOR MANAGING DIGITAL RIGHTS USING PORTABLE STORAGE DEVICE

(75) Inventors: Byung-rae Lee, Yongin-si (KR); Joong-chul Yoon, Seoul (KR); Kyung-im Jung, Seongnam-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1633 days.

(21) Appl. No.: 10/969,904

(22) Filed: Oct. 22, 2004

(65) Prior Publication Data

US 2005/0091507 A1 Apr. 28, 2005

Related U.S. Application Data

(60) Provisional application No. 60/512,927, filed on Oct. 22, 2003.

(30) Foreign Application Priority Data

Oct. 22, 2003 (KR) .................. 10-2003-0074000
Jul. 16, 2004 (KR) .................. 10-2004-0055647

(51) Int. Cl.
*G06F 11/30* (2006.01)
*G06F 12/14* (2006.01)

(52) U.S. Cl.
USPC ........................................... 713/193

(58) Field of Classification Search .............. 713/182, 713/193
See application file for complete search history.

(56) References Cited

U.S. PATENT DOCUMENTS

| 6,519,701 | B1 * | 2/2003 | Kawamura et al. ............... 726/2 |
| 7,010,808 | B1 * | 3/2006 | Leung et al. ................... 726/26 |
| 2003/0014630 | A1 * | 1/2003 | Spencer et al. ............... 713/168 |
| 2003/0018491 | A1 | 1/2003 | Nakahara et al. |
| 2003/0076957 | A1 | 4/2003 | Asokan et al. |
| 2003/0126440 | A1 | 7/2003 | Go et al. |
| 2003/0126456 | A1 | 7/2003 | Birzer et al. |
| 2003/0145044 | A1 | 7/2003 | Raivisto et al. |
| 2004/0088541 | A1 * | 5/2004 | Messerges et al. ........... 713/156 |
| 2004/0193546 | A1 * | 9/2004 | Tokutani et al. ............... 705/59 |
| 2005/0070248 | A1 * | 3/2005 | Gaur ............................ 455/410 |
| 2005/0071280 | A1 * | 3/2005 | Irwin et al. ..................... 705/59 |

FOREIGN PATENT DOCUMENTS

| EP | 1 209 657 A1 | 5/2002 |
| GB | 2 367 925 A | 4/2002 |
| JP | 2001237818 A | 8/2001 |

(Continued)

OTHER PUBLICATIONS

XP-002398862: A. J. Menezes; 1965; Handbook of Applied Cryptography; pp. 397-406.
Shiego Araki: "The Memory Stick", IEEE MICRO, Online!, vol. 20, 4. Aug. 2000, pp. 40-46, XP002314116.
"Memory Stick Copyright Protection Technology—MagicGate-", Techno World, May 22, 2000, XP002309105.

(Continued)

*Primary Examiner* — Edan Orgad
*Assistant Examiner* — Harris Wang
(74) *Attorney, Agent, or Firm* — Muir Patent Consulting, PLLC

(57) ABSTRACT

A method and apparatus for managing digital rights using a portable storage device are provided. The method includes a device performing primary authentication together with a license provider and establishing primary security association, the device performing secondary authentication together with the portable storage device and establishing secondary security association, receiving a license from the license provider, and transmitting the license to the portable storage device.

15 Claims, 11 Drawing Sheets

FOREIGN PATENT DOCUMENTS

| | | |
|---|---|---|
| JP | 2002-288453 A | 10/2002 |
| JP | 2002342518 A | 11/2002 |
| KR | 2003-0004206 A | 1/2003 |
| WO | 02/17048 A2 | 2/2002 |
| WO | WO 03/026207 A2 | 3/2003 |

OTHER PUBLICATIONS

Heuvel Van Den S A F A et al: "Secure Content Management in Authorised Domains", International Broadcasting Convention, Sep. 15, 2002, pp. 467-474, XP002273504.

* cited by examiner

METHOD AND APPARATUS FOR MANAGING DIGITAL RIGHTS USING PORTABLE STORAGE DEVICE

CROSS-REFERENCE TO RELATED APPLICATIONS

This application claims the priorities from Korean Patent Application Nos. 10-2003-0074000 and 10-2004-0055647 filed on Oct. 22, 2003 and Jul. 16, 2004, respectively, with the Korean Intellectual Property Office, and U.S. Provisional Patent Application No. 60/512,927 filed on Oct. 22, 2003 with the United States Patent and Trademark Office, the disclosures of which are incorporated herein in their entireties by reference.

BACKGROUND OF THE INVENTION

1. Field of the Invention

The present invention relates to digital rights management (DRM), and more particularly, to a method of using mobile DRM service in operation with a secure multimedia card (MMC).

2. Description of the Related Art

Recently, digital rights management (DRM) has been actively researched and developed. Commercial services using DRM have already been used or will be used. DRM needs to be used because of the following various characteristics of digital content. Unlike analog data, digital content can be copied without loss and can be easily reused, processed, and distributed, but a large amount of cost, labor, and time are needed to produce the digital content. When the digital content is copied and distributed without permission, a producer of the digital content may lose his/her profit, and his/her enthusiasm for creation may be discouraged. As a result, development of digital content business may be hampered.

There have been several efforts to protect digital content. Conventionally, digital content protection has been concentrated on preventing non-permitted access to digital content, permitting only people who have paid charges to access the digital content. However, when a person who has paid charges intentionally distributes the digital content to other people, these other people can use the digital content without paying charges. To solve this problem, DRM was introduced. In DRM, any one is allowed to freely access encoded digital content, but a license referred to as a rights object is needed to decode and execute the digital content. Accordingly, the digital content can be more effectively protected by using DRM.

A portable storage device is a connectable/disconnectable device such as a portable phone, a computer, or a digital camera which can store data of various types of digital equipment and is portable. The portable storage device includes a storage space for storing data and a portion performing an operation and control. A multimedia card (MMC) is a portable storage device and stores multimedia data to be used for various types of digital equipment, overcoming limitations of conventional hard disks or compact disks. The MMC also includes an operation part that is not included in conventional storage media, thereby having the ability to perform control. As a result, the MMC is suitable to accommodate various kinds of multimedia data in large capacities. Recently, a security function was added to the MMC, thereby developing a secure MMC that secures digital content during storage and transmission and protects copyright. With the development of the secure MMC, rights management on digital content becomes possible in a storage device and digital equipment.

Hereinafter, digital equipment such as a digital camera, a portable phone, a computer, and a digital camcorder will be generally referred to as a "device."

FIG. 1 is a conceptual diagram illustrating license transmission between a secure digital (SD) card 210 and a device 100. The SD card 210, which is one of representative secure memory cards, is not based on mobile DRM service, does not contain an operation for license acquisition while it defines operations between a *Content Protection for Recordable Media* (CPRM) compatible device and the same. Referring to FIG. 1, the operation of the SD card 210 is defined only in connection with the device 100 but is not defined in connection with a license provider. In other words, a memory card establishes security association with a device through authentication, while the device is able to use the memory card.

FIG. 2 is a conceptual diagram illustrating a license acquisition relationship between a conventional content protection (CP) secure MMC 250 and a license provider 500. The CP secure MMC 250, which is one of representative secure memory cards, is based on memory card DRM service. Thus, it is difficult for the CP secure MMC 250 to be applied to mobile DRM service for a mobile device. Referring to FIG. 2, a secure memory card 250 acquires a license directly from the license provider 500. However, since the CP secure MMC 250 is not equipped with a device for communicating with the license provider 500, it acquires a license from the license provider 500 through a terminal 300, which serves as a communication proxy. There is no security association between the license provider 500 and the terminal 300, or between the terminal 300 and the CP secure MMC 250.

According to this model, the CP secure MMC 250 is directly connected to the license provider 500 to acquire a license, and the license is stored in the CP secure MMC 250. As for CP secure MMC operation, only a memory card can be connected with a license provider. The CP secure MMC 250 is connected to the license provider 500 through the terminal 300, and the CP secure MMC 250 stores the license supplied from the license provider 500.

The conventional memory cards, such as the SD card 100 or the CP secure MMC 250, have a problem in that compatibility with mobile DRM service is not available, making it impossible to be operable with open mobile alliance (OMA) DRM that will be serviced in the near future. Therefore, there exists demand for new secure memory card models compatible with mobile DRM service and implementation methods thereof.

Accordingly, it would be desirable to develop secure memory card models and methods interoperable in a mobile DRM environment, methods in which a memory card can be directly linked to a license provider by mobile DRM service, and methods of operating a memory card as a device of a domain by mobile DRM service.

SUMMARY OF THE INVENTION

Illustrative, non-limiting embodiments of the present invention overcome the above disadvantages, and other disadvantages not described above.

A method and apparatus consistent with the present invention manages digital rights using a portable storage device.

The present invention is also provided to allow a user to use contents through a license stored in a portable storage device.

According to an aspect of the present invention, there is provided a method of managing digital rights using a portable storage device, the method comprising a device performing primary authentication together with a license provider and establishing primary security association, the device performing secondary authentication together with the portable storage device and establishing secondary security association, receiving a license from the license provider, and transmitting the license to the portable storage device.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
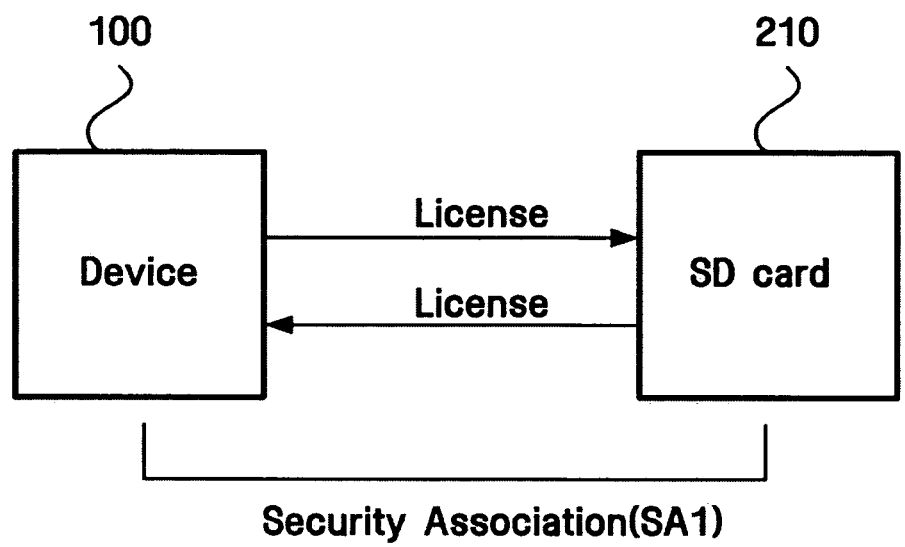
FIG. 1 is a conceptual diagram illustrating license transmission between a secure digital (SD) card and a device.
Figure 2:
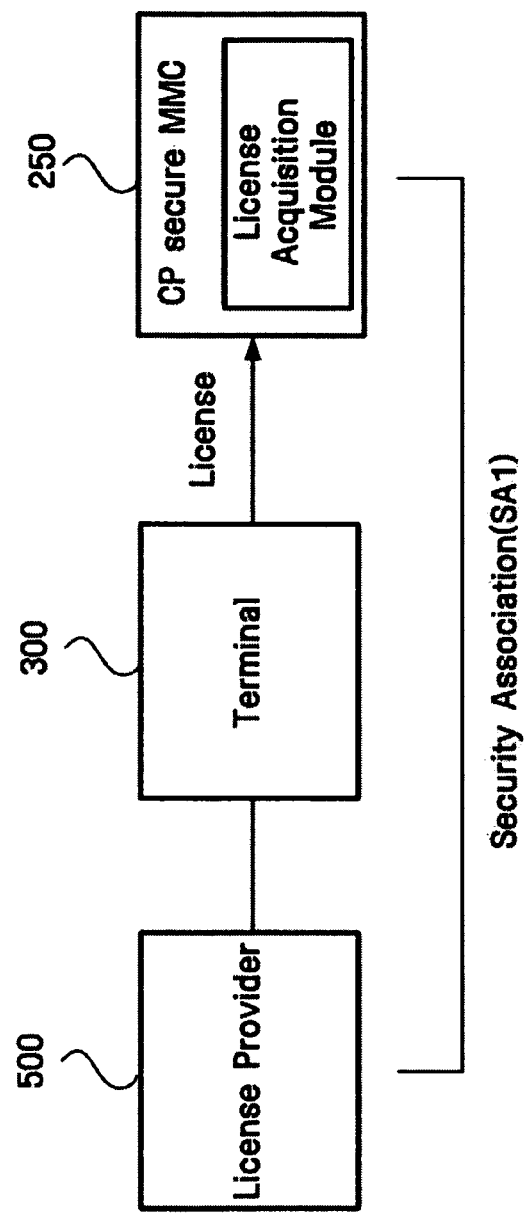
FIG. 2 is a conceptual diagram illustrating a license acquisition relationship between a conventional content protection (CP) secure multimedia card (MMC) and a license provider.

The present invention is directed to an apparatus and method of managing digital rights using a portable storage device.

A description of major terms used in the present invention will be set forth below.

User, Content Provider, and License Provider

A user means a person who possesses a device having a digital rights management (DRM) function. A content provider means an organization distributing content. A license provider (LP) means an organization selling and delivering a license corresponding to the content.

License

A license means an object itemizing a right to play content and is referred to as a rights object.

Portable Storage Device

A portable storage device is a connectable/disconnectable device such as a portable phone, a computer, or a digital camera which can store data of various types of digital equipment and is portable. The portable storage device includes a storage space for storing data and a portion performing an operation and control. A multimedia card (MMC) is the portable storage device and stores multimedia data to be used for various types of digital equipment, overcoming limitations of conventional hard disks or compact disks. The MMC also includes an operation part that is not included in conventional storage media, thereby having the ability to perform control. As a result, the MMC is suitable to accommodate various kinds of multimedia data in large capacities. Recently, a security function was added to the MMC, thereby developing a secure MMC that secures digital content during storage and transmission and protects copyright. With the development of the secure MMC, rights management on digital content becomes possible in a storage device and digital equipment. Embodiments of the present invention will be described based on a secure MMC, but the present invention is not restricted thereto and relates to a portable storage device.

Mobile Device

A mobile device means digital equipment such as a portable phone, a computer, or a digital camera that is portable and mobile. Recently, with an increasing demand on mobility of a device, portable and mobile digital equipment has been researched and developed a lot. Hereinafter, the digital equipment including a digital camera, a portable phone, a computer, and a digital camcorder is generally referred to as a mobile device.

Meanwhile, a portable storage device can also be used for other devices having a computing function that plays, moves, copies, or prints multimedia content as well as a mobile device. Accordingly, a device or a mobile device used in the embodiments of the present invention can use content stored in a portable storage device such as a secure MMC and can transfer or copy content using the portable storage device.

Encoding and Decoding

For transmission between a portable storage device and a device, a license and information are encoded in order to prevent data from being illegally revealed or operated during the transmission. In an embodiment of the present invention, an encryption key is used for encoding and decoding. When data is encoded using a key referred to as a "K" and transmitted, a device and a portable storage device that have "K" receive and decode the data, store the decoded data in their storage part, and perform a function requested by the data.

Symmetric Key Algorithm

A symmetric key algorithm uses a single key for encoding and decoding. The single key is agreed or defined in advance by an encoding party and a decoding party.

In the embodiments of the present invention described below, a "part" or a "module" indicates a software component or a hardware component such as a field-programmable gate array (FPGA) or an application-specific integrated circuit (ASIC). The module performs a particular function but is not restricted to software and hardware. The module may be included in an addressable storage medium or may be configured to play one or more processors. Accordingly, modules may include components such as software components, object-oriented software components, class components, and task components, processes, functions, attributes, procedures, subroutines, segments of a program code, drivers, firmware, microcodes, circuits, data, databases, data structures, tables, arrays, and parameters. Components and features provided by modules may be combined into a smaller number of components and a smaller number of modules, or may be divided into a greater number of components and a greater number of modules. In addition, components and modules may be implemented such that they play one or more central processing units (CPUs) in a device or a secure MMC.

Hereinafter, preferred embodiments of the present invention will be described in detail with reference to the attached drawings.

Figure 3:
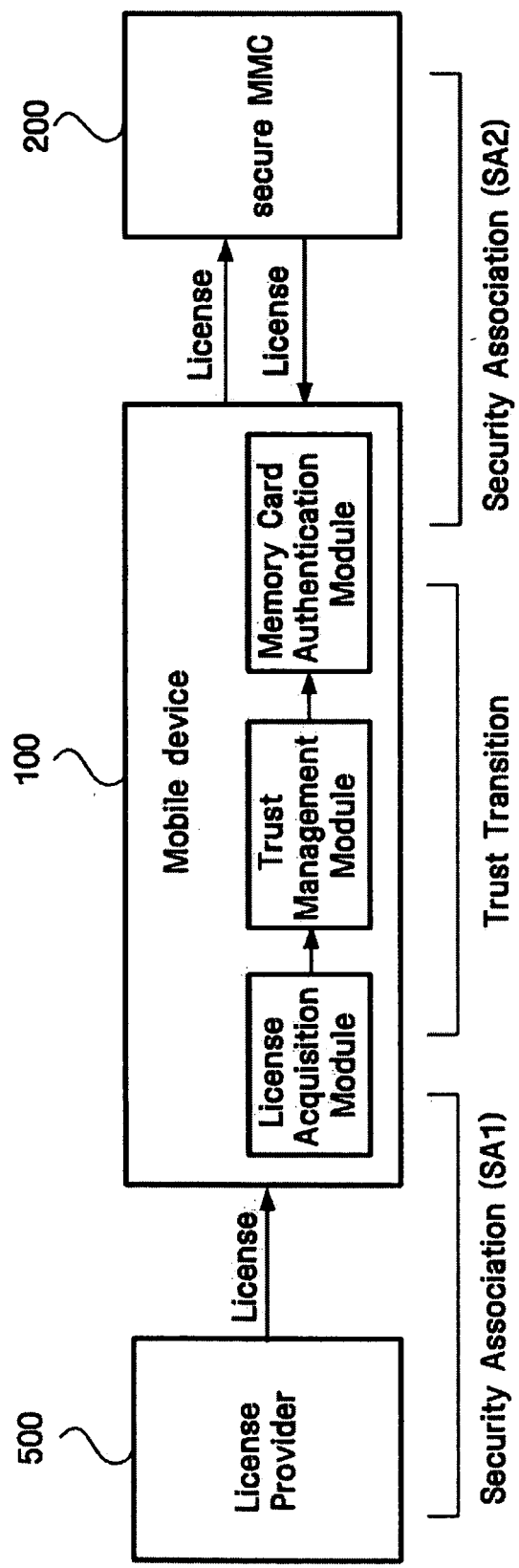
FIG. 3 is a conceptual diagram illustrating a structure of a mobile device acquiring a license from a license provider and transmitting the same to a secure MMC according to an embodiment of the present invention.

FIG. 3 is a conceptual diagram illustrating the configuration in which a mobile device 100 acquires a license from a license provider and sends the same to a secure MMC 200.

During authentication, the mobile device 100 and a secure MMC 200 identify each other. In FIG. 3, there are two types of security associations (SAs) SA1 and SA2 established between a license provider 500 and the mobile device 100 and between the mobile device 100 and the secure MMC 200, respectively. This differs from a conventional content protection secure MMC in which a single security association SA1 exists between the secure MMC 200 and the license provider 500. In this way, a model in which the secure MMC 200 is able to obtain a license in a mobile digital rights management (DRM) environment is proposed in FIG. 3. The license delivered through a mobile DRM service is moved to the secure MMC 200. The mobile device 100 uses the mobile multimedia card 200 to perform play, move, and copy functions.

The security association SA1 is a process by which the mobile device 100 acquires a license from the license provider 500. Predetermined authentication and billing through the device 100 may be required to acquire the license. License acquisition can be made using wired or wireless communications. The present invention can be applied to wireless communication applications into which research and commercialization is actively underway. A license acquisition module may include the authentication or billing functions.

A trust management module performs preprocessing on the license acquired through the SA1 process to move the same to another device or a portable storage device. For example, the trust management module may convert the license in a file into a form suitable for a file structure of the portable storage device.

As described above, the license contains a rights object associated with the use of content. Under DRM, content and license may be distributed separately. That is, the content encrypted for distribution and a license that is a rights object associated with the use of the content can be delivered via separate channels. Thus, only an authorized user is allowed to move or copy the license. To achieve this purpose, mutual authentication and confirming possession of a certificate is required to move or copy the license. Furthermore, to prevent unrestricted movement or copying, the license can be modified upon moving or copying the same.

Thus, trust transition may require modification of information contained in the license upon movement or copying. In addition, when the license includes constraints against the rights to play, modification of the appropriate license information may be needed each time the content is played. That is, trust transition includes predetermined processing of a license for use.

The other security association SA2 exists between the secure MMC 200 and the mobile device 100. This process includes preventing data loss or tampering upon exchanging information with the secure MMC 200 and validating whether the secure MMC 200 is an authenticated portable storage device. The authentication process between the mobile device 100 and the secure MMC 200 will be described later with reference to FIG. 4.

Before delivering DRM services according to the deployment shown in FIG. 3, the secure MMC 200 must have an encryption key and a certificate used in performing mutual authentication with the mobile device 100. Prior to performing this authentication process for SA2, the secure MMC 200 must hold a protocol module for performing authentication with the mobile device 100. Under the above conditions, the secure MMC 200 performs authentication with the mobile device 100. Once the authentication has been completed, the secure MMC 200 is allowed to receive the license that has been acquired by the mobile device 100 from the license provider 500. The authentication between the mobile device 100 and the secure MMC 200 will now be described in detail.

Authentication is achieved when establishing the security association SA2 between the mobile device 100 and the secure MMC 200. A new authentication is required upon cancellation of the existing security association or authentication. The mobile device 100 and the secure MMC 200 share a key created after the authentication and perform an application with the common key. During the mutual authentication, the mobile device 100 verifies whether the secure MMC is suitable for authentication and cancels the association if not suitable. The secure MMC 200 denies data request if the mobile device 100 fails the authentication.

Figure 4:
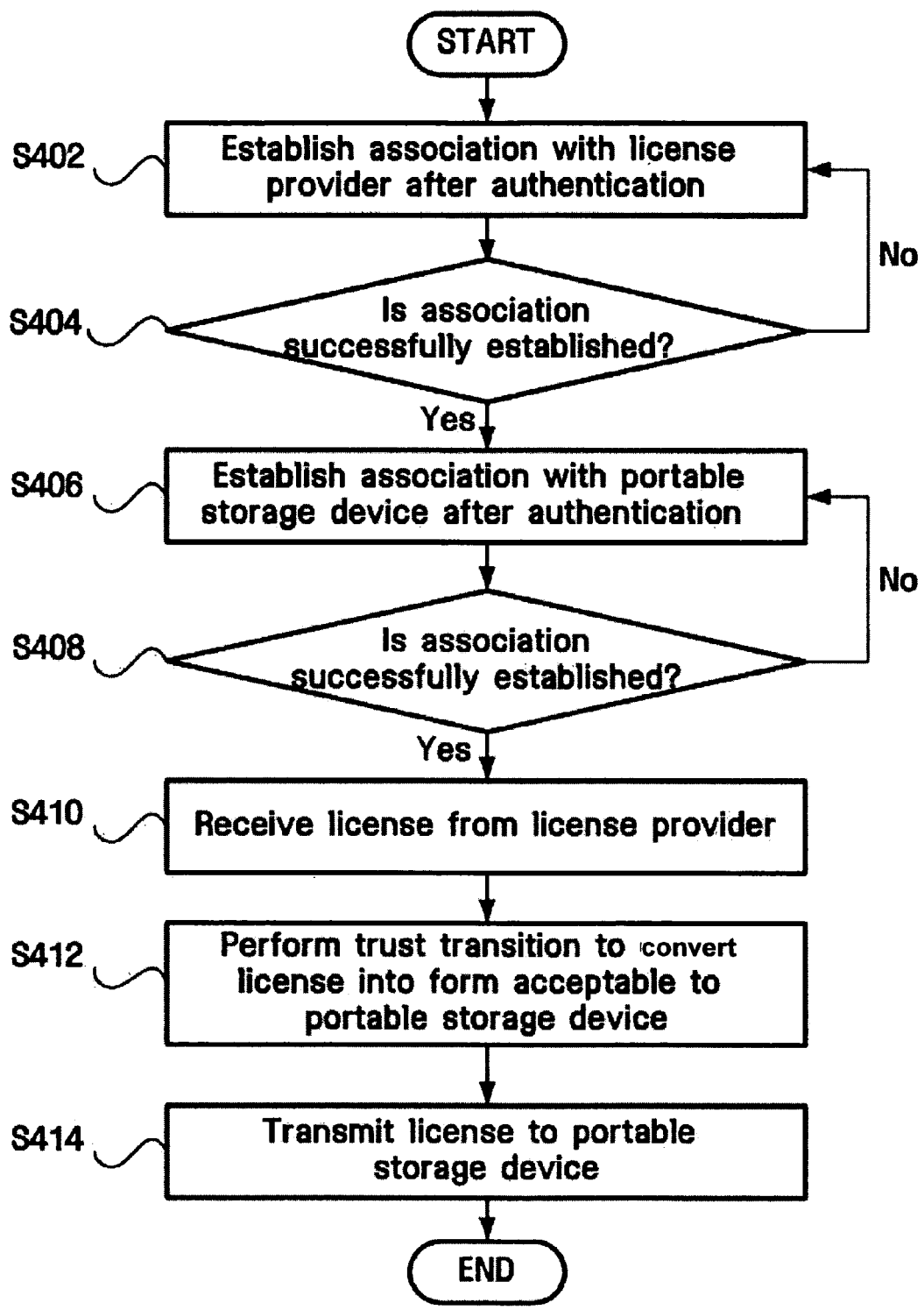
FIG. 4 is a flowchart illustrating a process of a mobile device receiving a license from a license provider and transmitting the same to a portable storage device according to an embodiment of the present invention.

FIG. 4 is a flowchart illustrating a process of a device receiving a license from a license provider and sending the same to a portable storage device according to an embodiment of the present invention. Referring to FIG. 4, a device establishes security association with a license provider and a portable storage device and sends a license to the portable storage device. More specifically, in step S402, a security association is established with the license provider after authentication. The authentication allows secure transmission/reception through the security association between the license provider and the device. When the security association is successfully established in step S404, authentication is performed with the portable storage device for security association in step S406. This allows exchange of encryption keys in order to transmit and receive data between the device and the portable storage device without being lost or tampered with. When the security association is successfully established in step S408, the device receives a license from a license provider in step S410. The device performs trust transition on the license for conversion into a form acceptable to the portable storage device (S412). The license that has undergone the trust transition is then transmitted to the portable storage device (S414), and the license stored in the portable storage device is used by the device that desires to use the relevant content. Another device that has passed authentication is allowed to use the license associated with use of the relevant content. The steps S402 and S406 shown in FIG. 4 may be performed in a reverse order depending on the type of application. That is, a device that has completed authentication and association with the portable storage device may perform authentication with the license provider for security association.

Figure 5:
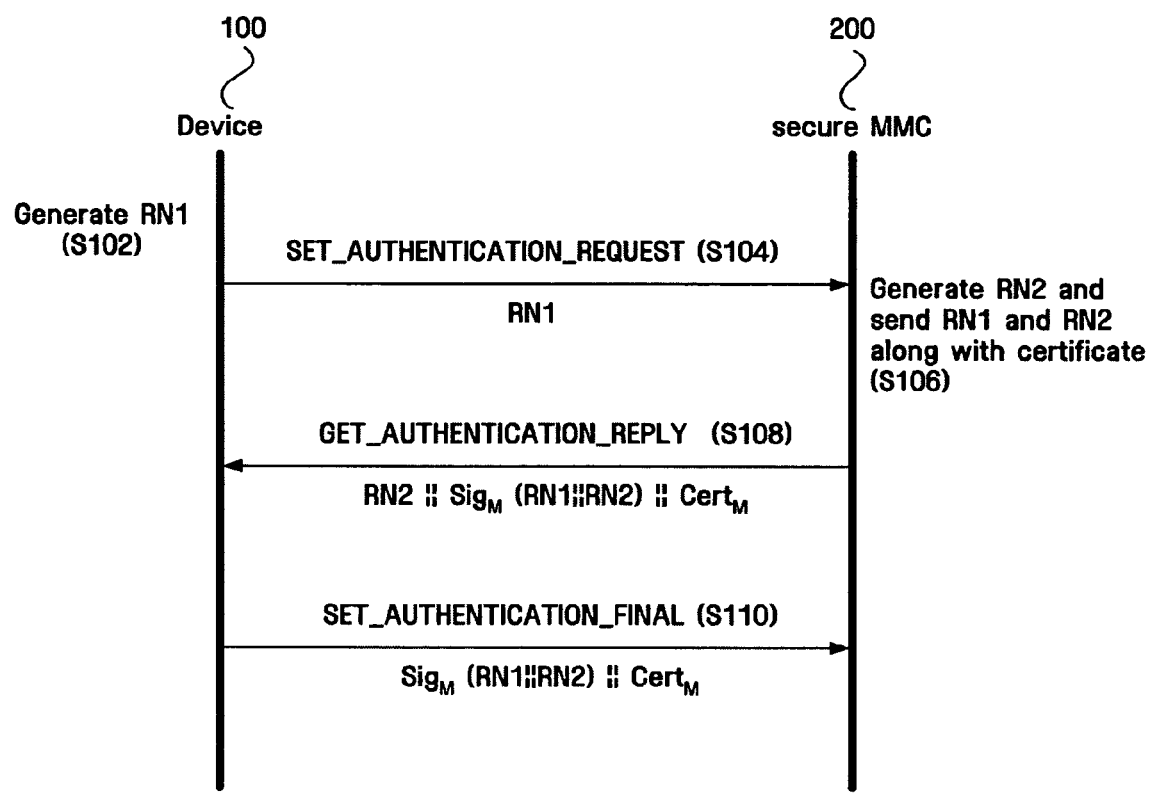
FIG. 5 is a flowchart illustrating an authentication procedure between a device and a secure MMC according to an embodiment of the present invention.

FIG. 5 is a flowchart illustrating a process of performing authentication between a device 100 and a secure MMC 200 according to an exemplary embodiment of the present invention. The authentication is performed upon request from the device, after which both the device and the secure MMC have a common key.

More specifically, in step S102, the device 100 generates a random number RN1. This number RN1 may be obtained through a random number generation algorithm or by extracting some digits from a predefined random number list. In step S104, the random number RN1 thus obtained is sent to the secure MMC 200 as a parameter of a security request command SET_AUTHENTICATION_REQUEST. Upon receipt of the random number RN1, the secure MMC 200 generates a random number RN2 in step S106, and sends a key with the random numbers RN1 and RN2 being combined and a certificate in step S108. The device 100 receives the key and sends a message indicating that the authentication has been completed to the secure MMC 200 in step S110. Then, the common key is used as an encryption key to perform an application.

Figure 6:
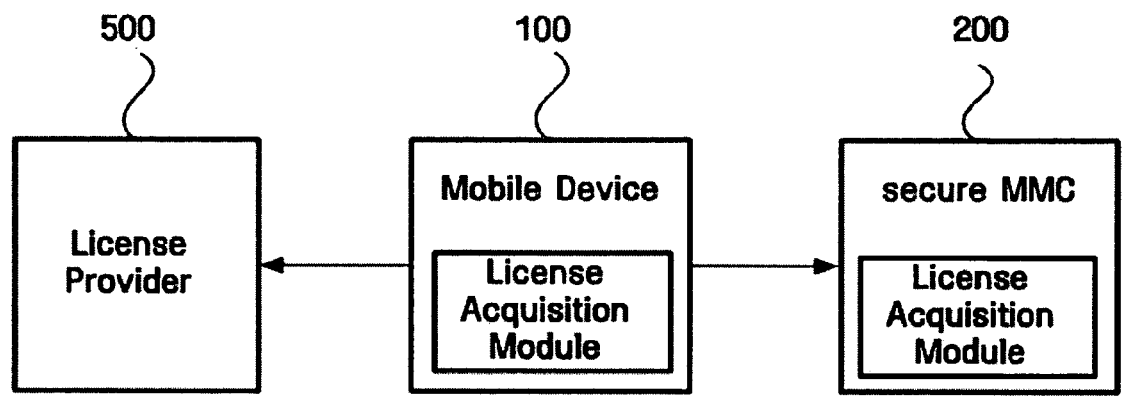
FIG. 6 is a flowchart illustrating a process of a secure MMC acquiring a license from a license provider according to an embodiment of the present invention.

FIG. 6 is a flowchart illustrating a process of a secure MMC 200 acquiring a-license from a license provider 500.

A security association SA may be established between the license provider 500 and the secure MMC 200 through communications. The secure MMC 200 having no function to perform communications can use a communication line provided by a (mobile) device using the (mobile) device 100 as a proxy. In the illustrative embodiment, since it is assumed that the secure MMC 200 connects to a mobile DRM service, an authentication protocol between the secure MMC 200 and the license provider 500 complies with a protocol provided by a mobile DRM. For example, the secure MMC 200 operating under an open mobile alliance (OMA) DRM service may execute a license acquisition protocol defined in the OMA DRM with the license provider 500 through the mobile device 100. Thus, the main difference between the secure MMC 200 in a mobile DRM system and Content Protection Secure MultiMediaCard (CP Secure MMC) is that the former has a license acquisition module held by the mobile device 100 and acquires a license by executing a license acquisition protocol defined in a mobile DRM service.

Before delivering DRM services according to the configuration shown in FIG. 6, the secure MMC 200 has a license acquisition protocol module that can be executed with the license provider 500 in the mobile DRAM services as well as an encryption key and a certificate used in performing mutual authentication with the license provider 500. This process is performed as illustrated in FIG. 4. Under the above conditions, the secure MMC 200 executes an authentication protocol with the license provider 500 through the mobile device 100 according to authentication mechanisms defined in the mobile DRM services. Once the authentication has been successfully achieved, the secure MMC 200 is allowed to acquire a license from the license provider 500.

According to the license acquisition protocol, a license stored in the device 100 is securely transmitted and received after being encrypted with an encryption key created through the authentication. When the secure MMC 200 has a license acquisition module, the license can be transmitted and received smoothly and seamlessly between the devices 100 through the secure MMC 200. The license may be a file containing rights objects, but unlike in a common file, various kinds of information contained in the license may be modified when the license moves from one device to another.

A license may be moved independently of content. Thus, a license stored in a portable storage device allows use of content stored in the device 100. After establishing association with the secure MMC 200, the device 100 having no license is allowed to read license information from the secure MMC 200 and play or otherwise use the content.

Conversely, the mobile device 100 storing a license acquired from the license provider 500 is allowed to move the license to the secure MMC 200 after the lapse of a predetermined period of time. When only the encrypted content is available, a license associated with use of the content may be later acquired because the license can be moved independently of the content.

Figure 7:
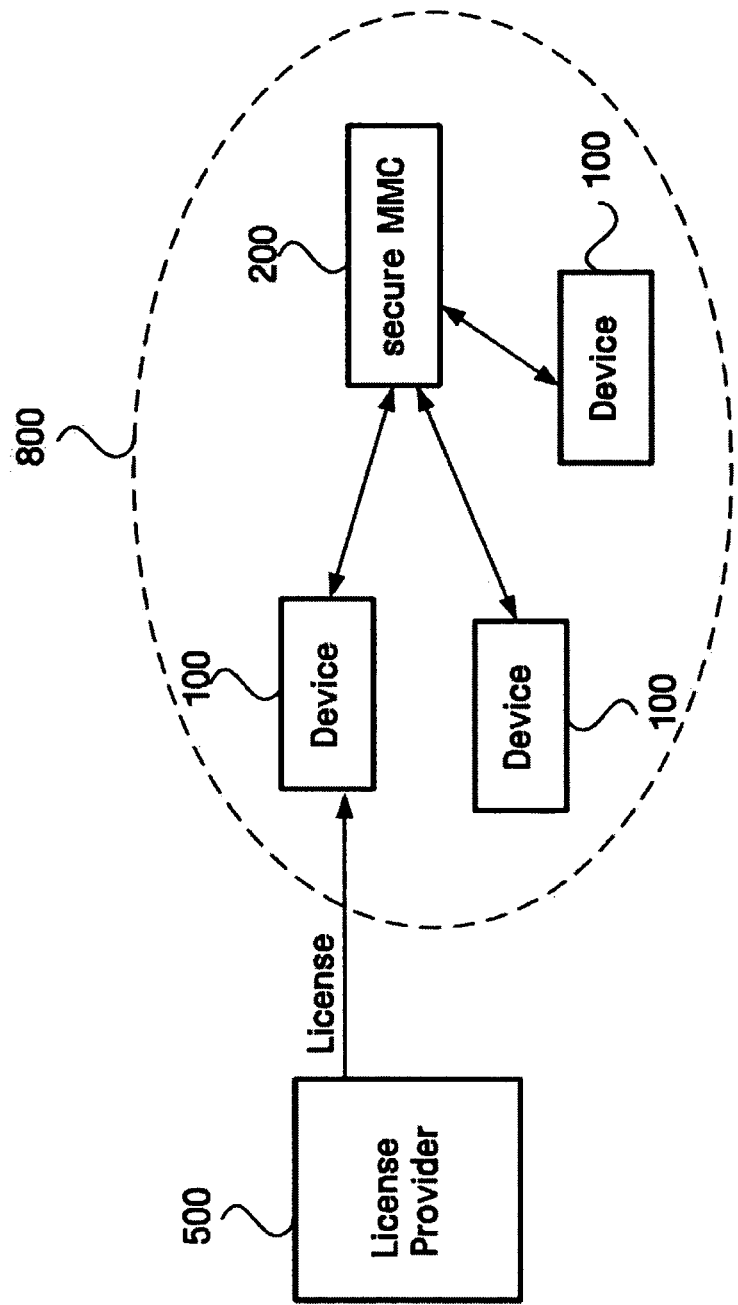
FIG. 7 is a conceptual diagram illustrating a mechanism in which devices within a domain share the content using a secure MMC according to an embodiment of the present invention.

FIG. 7 is a conceptual diagram illustrating a mechanism in which devices 100 within a domain share the content using a secure MMC 200. One method for content sharing in DRM is to allow the devices 100 within the same domain to share the content. To this end, the highly secure MMC 200 delivers a license only to the devices 100 that operate within a DRM service. A domain means a collection of devices held by a specific individual or family. Interrupting the flow of content or license in electronic devices forming a home network or computer or cellular phone held by an individual can make the use of content inconvenient because the use of the appropriate content or license may be restricted to a specific user or group of users. Thus, it is necessary to share content or license between devices within the same domain.

A specific device can manage a domain, or a separate domain manager may manage licenses within the appropriate domain. The device 100 may move a license to the secure MMC 200 or vice versa. The secure MMC 200 and the device 100 are registered with a DRM server that manages the domains. This registration can be made by transmitting identification (ID) information on the secure MMC 200 from the secure MMC 200 to the DRM server. That is, when one typical device acts as a DRM server, the secure MMC 200 can be registered with the DRM server by establishing security association with the device 100. When a separate appliance other than the devices 100 or the license provider 500 acts as a DRM server, which means that the secure multimedia cannot directly communicate with the device 100, the registration is made by transmitting ID information on the secure MMC 200 from a device that has established association with the secure MMC 200 to the DRM server. Once the registration has been completed, the secure MMC 200 receives a license from another device within the same domain, and the other device plays the content or receives a license using the secure MMC 200.

Figure 8:
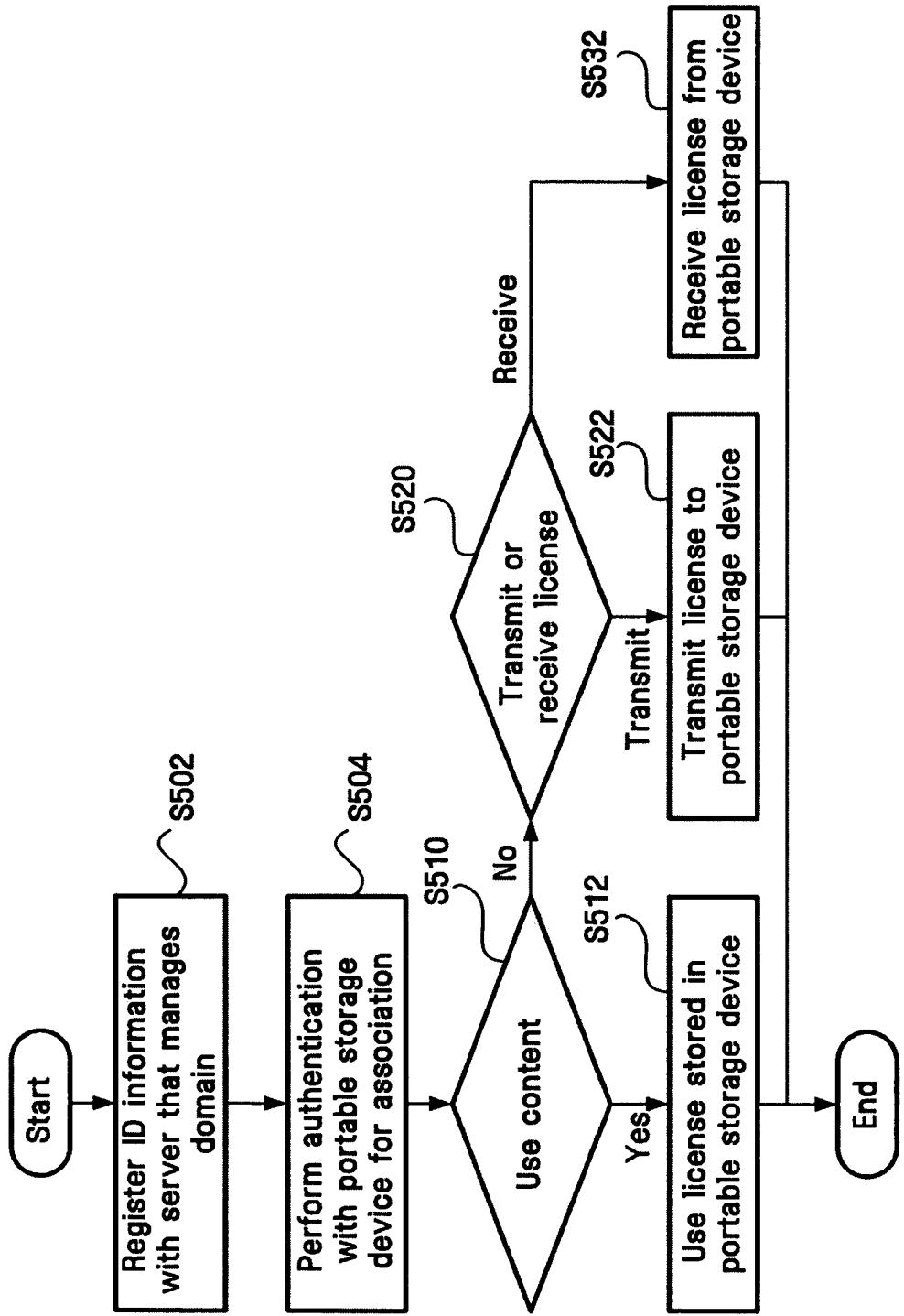
FIG. 8 is a flowchart illustrating a method of a device using a license stored in a portable storage device within a domain according to an embodiment of the present invention.

FIG. 8 is a flowchart illustrating a process of a device using a license stored in a portable storage device within the same domain.

The process begins by a device attempting to perform registration with a created domain. In step S502, the device registers its ID information with a server that manages the appropriate domain. The server may be a device using a DRM service or a server only responsible for managing the domain. Alternatively, a license provider may serve to manage the domain. The device registered with the domain is later allowed to use a license stored in the portable storage device within the same domain. To achieve this, in step S504, authentication is performed between the device and the portable storage device for security association. During authentication, an encryption key is created for secure transmission and reception of data between the device and the portable storage device. Once the security association has been established, the device is permitted to use the DRM service with the portable storage device. When the device desires to use the content in step S510, it requests a license associated with the use of the content from the portable storage device. By this request, the device is allowed to use the content in step S512.

Meanwhile, a license may be transmitted or received separately from the use of the content in step S520. In step S522, the device transmits a license received from the license provider to the portable storage device so that another device within the same domain can use the license. In step S532, the device may also receive a license from the portable storage device in order to use the license received by another device from the license provider.

Figure 9:
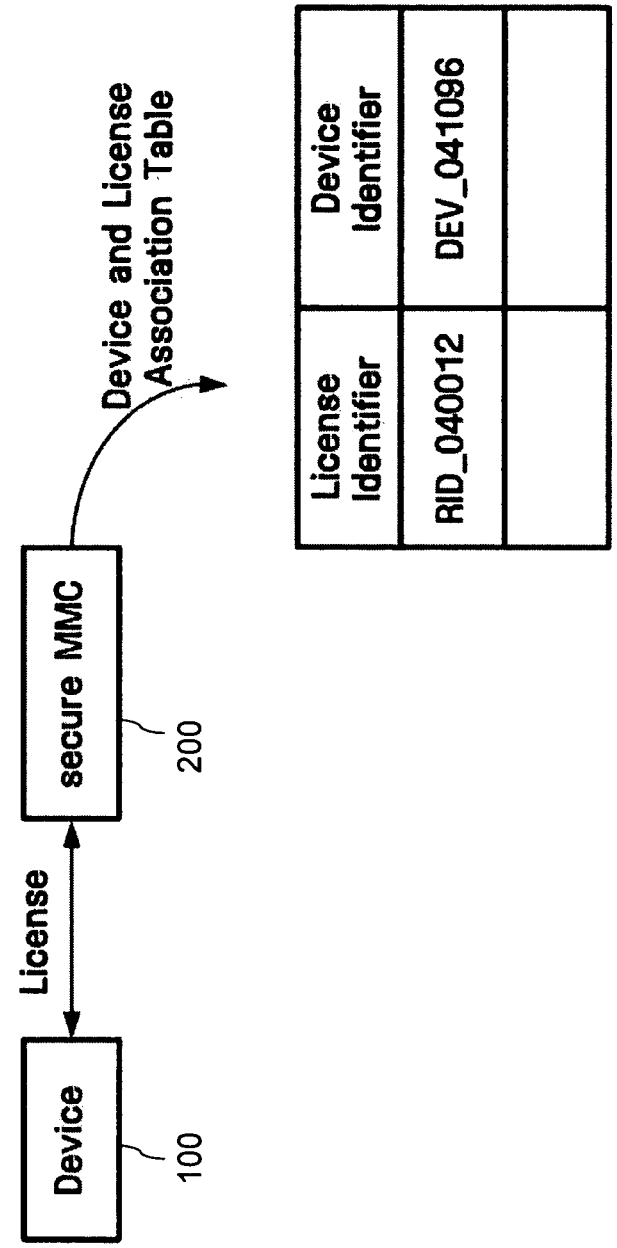

FIG. 9 shows a conceptual diagram showing an information storage table within a secure multimedia card according to an exemplary embodiment of the present invention. A license can be moved or copied between a device 100 and a secure MMC 200. A license stored in the secure MMC 200 may be moved or copied to the device 100 or another device or provides information required to play the relevant content. Thus, the secure MMC 200 stores a table describing a license and information on the device 100 that has transmitted the license within itself. The information specified in the table allows the secure MMC 200 to identify the device 100 that has transmitted a license held by the secure MMC 200.

Figure 10:
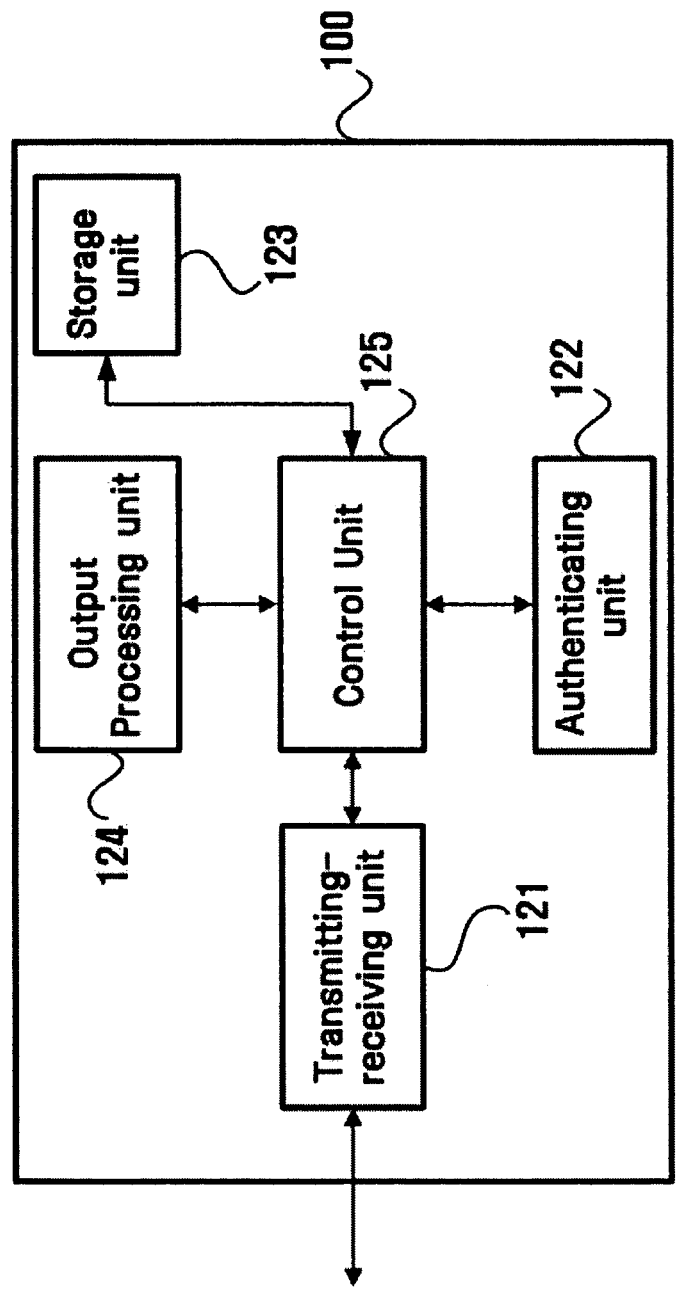
FIG. 10 is a block diagram of a device according to an embodiment of the present invention.

FIG. 10 is a block diagram of a device 100 according to an exemplary embodiment of the present invention.

Referring to FIG. 10, the device 100 includes a transmitting-receiving unit 121, an authenticating unit 122, a storage unit 123, an output processing unit 124, and a control unit 125. The transmitting-receiving unit 121 exchanges information with a portable storage device. The transmitting-receiving unit 121 may exchange information with a device other than the portable storage device. To perform authentication, the authenticating unit 122 performs encryption and decryption and creates a common encryption key. That is, the authenticating unit 122 decrypts data received from the transmitting-receiving unit 121 and encrypts a specific rights object for transmission to the portable storage device. The storage unit 123 stores rights objects received from a license provider or the portable storage device. The stored rights objects may be transmitted to another portable storage device. The output processing unit 124 plays or outputs content using a rights object. Such output units include a speaker, a monitor or other devices.

The control unit 125 controls data flow among the transmitting-receiving unit 121, the authenticating unit 122, and the output processing unit 124 and performs particular operations. The control unit 125 also performs the trust transition described with reference to FIG. 3.

Figure 11:
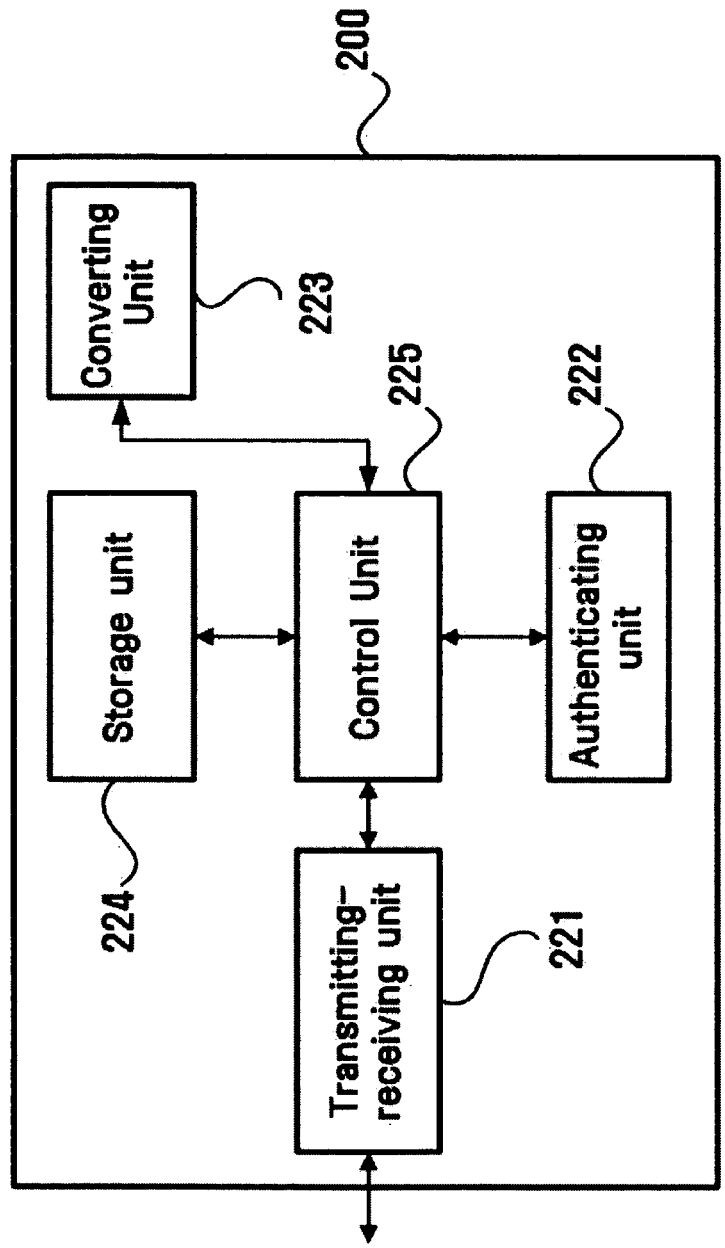
FIG. 11 is a block diagram of a portable storage device according to an embodiment of the present invention.

FIG. 11 is a block diagram of a portable storage device (secure MMC) 200 according to an exemplary embodiment of the present invention.

Referring to FIG. 11, the portable storage device 200 includes a transmitting-receiving unit 221, an authenticating unit 222, a converting unit 223, a storage unit 224, and a control unit 225. The transmitting-receiving unit 221 receives a command and a rights object from a device and provides a path for transmitting the stored rights objects. To perform authentication, the authenticating unit 222 performs encryption and decryption and creates a common encryption key. That is, the authenticating unit 222 decrypts data received from the transmitting-receiving unit 221 and encrypts a specific rights object for transmission to the device.

The converting unit 223 converts the rights object received through the transmitting-receiving unit 221 and then decrypted by the authenticating unit 222 into a file format supported by the portable storage device. During conversion, the converting unit 223 may encrypt the rights object again using a unique encryption algorithm. The storage unit 224 stores the rights object adequately converted by the converting unit 223. The control unit 225 controls data exchange among the above elements and performs particular operations. Furthermore, the control unit 225 receives a command received from the device, generates a control signal necessary for execution of the command, and outputs the same to each element.

It will be understood by those of ordinary skill in the art that various changes in form and details may be made therein without departing from the spirit and scope of the present invention as defined by the following claims. Therefore, it is to be appreciated that the above described exemplary embodiments are for purposes of illustration only and not to be construed as a limitation of the invention. The scope of the invention is given by the appended claims, rather than the preceding description, and all variations and equivalents which fall within the range of the claims are intended to be embraced therein.

According to the present invention, digital rights can be managed using a portable storage device. Also, contents can be used by various devices within a domain through a portable storage device.

What is claimed is:

1. A method of managing digital rights using a multimedia card, the multimedia card configured to be connected to and disconnected from at least a first user device and a second user device, the method comprising:

registering the multimedia card with a domain on which the first user device and the second user device are registered;

performing authentication between the multimedia card and the first user device to establish a first security association that is part of an authentication protocol established between the multimedia card and a license provider;

after establishing the first security association, moving a first license received from the license provider from the first user device to the multimedia card;

performing authentication between the multimedia card and the second user device to establish a second security association that is part of an authentication protocol established between the multimedia card and the license provider;

after establishing the second security association, moving a second license received from the license provider from the second user device to the multimedia card;

wherein both the first user device and the second user device are permitted to use the first license from the multimedia card in order to use the content associated with the first license and to use the second license from the multimedia card in order to use content associated with the second license;

performing primary authentication between the first user device and the license provider to establish a primary security association;

performing secondary authentication between the first user device and the multimedia card to establish a secondary security association that comprises the first security association, wherein as a result of performing the primary and secondary authentications, the multimedia card executes the authentication protocol with the license provider; and while performing the authentication protocol:

receiving the first license by the first user device from the license provider; and moving the first license from the first user device to the multimedia card, wherein the first user device and the multimedia card share a common key created after the primary authentication and the secondary authentication and perform moving the first license using the common key.

2. The method of claim 1, further comprising:

moving a third license received from the license provider from the first user device to the multimedia card, wherein both the first user device and the second user device are permitted to use the third license from the multimedia card in order to use content associated with the third license.

3. The method of claim 1, further comprising:
using, by the first user device, the first license stored at the multimedia card, in order to play back content associated with the first license at the user device, or using, by the second user device, the first license stored at the multimedia card, in order to play back content associated with the second license at the second user device.

4. The method of claim 1, further comprising:
registering additional user devices with the domain,
wherein the additional user devices are permitted to use the first license and the second license from the multimedia card in order to use content.

5. The method of claim 1, wherein:
at least one of the first user device and the second user device is a mobile device.

6. A method of managing digital rights using a multimedia card, the multimedia card configured to be connected to and disconnected from at least a first user device and a second user device, the method comprising:
registering the multimedia card with a domain on which the first user device and the second user device are registered;
performing authentication between the multimedia card and the first user device to establish a first security association that is part of a first authentication protocol established between the multimedia card and a first license provider;
after establishing the first security association, moving a first license received from the first authentication protocol license provider from the first user device to the multimedia card;
performing authentication between the multimedia card and the first user device to establish a second security association that is part of a second authentication protocol established between the multimedia card and a license provider;
after establishing the second security association, moving a second license received from the second authentication protocol license provider from the first user device to the multimedia card;
wherein both the first user device and the second user device are permitted to use the first license from the multimedia card in order to use content associated with the first license, and to use the second license from the multimedia card in order to use content associated with the second license;
performing primary authentication between the first user device and the first authentication protocol license provider to establish a primary security association;
performing secondary authentication between the first user device and the multimedia card to establish a secondary security association that comprises the first security association, wherein as a result of performing the primary and secondary authentications, the multimedia card executes the first authentication protocol with the first authentication protocol license provider; and
while performing the first authentication protocol:
receiving the first license by the first user device from the first license provider; and
moving the first license from the first user device to the multimedia card,
wherein the first user device and the multimedia card share a common key created after the primary authentication and the secondary authentication and perform moving the first license using the common key.

7. The method of claim 6, further comprising:
moving a third license received from a license provider from the first user device to the multimedia card,
wherein both the first user device and the second user device are permitted to use the third license from the multimedia card in order to use content associated with the license.

8. The method of claim 6, further comprising:
using, by the first user device, the first license stored at the multimedia card, in order to play back content at the user device, or using, by the second user device, the first license stored at the multimedia card, in order to play back the content at the second user device, wherein the content is associated with the license.

9. The method of claim 6, further comprising:
registering additional user devices with the domain,
wherein the additional user devices are permitted to use the first license from the multimedia card in order to use content associated with the first license, and to use the second license from the multimedia card in order to use content associated with the second license.

10. The method of claim 6, wherein:
at least one of the first user device and the second user device is a mobile device.

11. A method of managing digital rights using a multimedia card, the multimedia card configured to be connected to and disconnected from at least a first user device and a second user device, the method comprising:
registering the multimedia card with a domain;
performing primary authentication between the multimedia card and the first user device to establish a first security association that is part of an authentication protocol established between the multimedia card and a license provider, and performing secondary authentication between the first user device and a license provider to establish a secondary security association that comprises the first security association, wherein as a result of performing the primary and secondary authentications, the multimedia card executes the authentication protocol with the license provider;
while performing the authentication protocol:
receiving a first license by the first user device from the license provider; and
moving the first license from the first user device to the multimedia card,
wherein the first user device and the multimedia card share a common key created after the primary authentication and the secondary authentication and perform moving the first license using the common key;
performing authentication between the multimedia card and the second user device to establish a second security association that is part of an authentication protocol established between the multimedia card and the license provider; and
after establishing the second security association, moving a second license received from the license provider from the second user device to the multimedia card;
wherein the multimedia card permits both the first user device and the second user device to use content associated with the first license and to use content associated with the second license.

12. The method of claim 11, further comprising:
moving a third license received from the license provider from the first user device to the multimedia card, wherein the multimedia card permits both the first user device and the second user device to use content associated with the third license.

13. The method of claim 12, further comprising:
registering the first user device and the second user device with the domain.

14. The method of claim 12, wherein:
the first license stored at the multimedia card permits both the first user device and the second user device to play back content associated with the first license; and
the second license stored at the multimedia card permits both the first user device and the second user device to play back content associated with the second license.

15. The method of claim 12, further comprising:
using the first license stored at the multimedia card for playing back content stored at the first user device.

* * * * *